(12) United States Patent
Huber et al.

(10) Patent No.: US 6,891,337 B2
(45) Date of Patent: May 10, 2005

(54) LIGHTING SYSTEM

(75) Inventors: Andreas Huber, Maisach (DE);
Herbert Kästle, Traunstein (DE);
Walter Limmer, Munich (DE); Peter Niedermeier, Munich (DE)

(73) Assignee: Patent-Treuhand-Gesellschaft fur elektrische Gluhlampen mbH, Munich (DE)

( * ) Notice: Subject to any disclaimer, the term of this patent is extended or adjusted under 35 U.S.C. 154(b) by 162 days.

(21) Appl. No.: 10/408,109

(22) Filed: Apr. 8, 2003

(65) Prior Publication Data

US 2003/0193302 A1 Oct. 16, 2003

(30) Foreign Application Priority Data

Apr. 15, 2002 (DE) .......................................... 102 16 596

(51) Int. Cl.[7] .............................. G05F 1/00; H05B 37/02
(52) U.S. Cl. ........................................ 315/291; 315/307
(58) Field of Search ................................. 315/244, 246, 315/291, 248, 307, DIG. 7

(56) References Cited

U.S. PATENT DOCUMENTS

| | | | |
|---|---|---|---|
| 3,890,537 A | 6/1975 | Park et al. ................... 315/208 |
| 4,904,907 A | 2/1990 | Allison et al. ............... 315/307 |
| 5,491,386 A | 2/1996 | Eriguchi et al. ........ 315/209 R |
| 5,623,187 A | 4/1997 | Caldeira et al. ............ 315/307 |
| 6,184,633 B1 | 2/2001 | Kramer ....................... 315/246 |
| 6,384,544 B1 * | 5/2002 | Greenwood et al. ........ 315/291 |
| 6,437,517 B1 * | 8/2002 | Kramer ...................... 315/246 |
| 6,489,731 B1 * | 12/2002 | Bruning et al. ............. 315/291 |
| 6,498,441 B1 * | 12/2002 | Shen .......................... 315/291 |
| 6,538,395 B2 * | 3/2003 | Szabados ..................... 315/291 |
| 6,580,231 B1 * | 6/2003 | Kramer ....................... 315/291 |

* cited by examiner

Primary Examiner—Tan Ho
Assistant Examiner—Minh Dieu A

(57) ABSTRACT

Lighting system for high-pressure discharge lamps which can generate a lamp voltage UL which is amplitude and, if necessary, frequency-modulated. The frequency modulation is provided by an inverter whose inverter frequency is modulated. The inverter is fed by a clocked d.c. voltage supply which emits an operating voltage U0 which is amplitude-modulated.

9 Claims, 3 Drawing Sheets

LIGHTING SYSTEM

TECHNICAL FIELD

The invention is based on a lighting system with the following features:

A d.c. voltage supply which is clocked at a converter frequency and supplies an operating voltage, an inverter which is fed by the operating voltage and has output terminals at which a lamp voltage is present, a high-pressure discharge lamp which is connected to the output terminals and has at least one acoustic resonant frequency.

The invention is particularly concerned with the excitation of acoustic resonances in a high-pressure discharge lamp by bringing about amplitude and, if necessary, frequency modulation of the lamp voltage in a cost-effective manner.

BACKGROUND ART

Publication U.S. Pat. No. 6,184,633 (Kramer) demonstrates the advantages which result when the lamp voltage of a high-pressure discharge lamp (also referred to for short as lamp below) has a time characteristic which makes use of acoustic resonances in the lamp. This essentially entails a longitudinal resonance in the lamp being excited as a result of amplitude modulation of the lamp voltage and this resonance counteracts undesired demixing processes in the plasma in the lamp. It is even possible for the shape of the plasma, such as constrictions and straight sections, for example, to be influenced in a targeted manner. In addition, it is possible for other resonances, which are not affected by the amplitude modulation, to be suppressed or only sporadically excited by frequency modulation of the lamp voltage. The abovementioned publication describes the effects referred to, but there is no indication as to how the required waveform of the lamp voltage is produced in a cost-effective manner. For the purposes of research, function generators and power amplifiers are available for producing complex voltage waveforms. Such components are, however, not practicable for users of the lamps in question and are not acceptable for reasons of cost. Instead, an operating device is required for commercial applications which, in combination with the lamp, constitutes a cost-effective lighting system.

SUMMARY OF THE INVENTION

It is an object of the present invention to provide a lighting system having the following features:

a d.c. voltage supply which is clocked at a converter frequency and supplies an operating voltage, an inverter which is fed by the operating voltage and has output terminals at which a lamp voltage is present, a high-pressure discharge lamp which is connected to the output terminals and has at least one acoustic resonant frequency, and effects amplitude modulation and, if necessary, also frequency modulation of the lamp current with low outlay.

This object is achieved by a converter frequency that is an n-fold multiple of an acoustic resonant frequency, where n is a natural number other than zero. Particularly advantageous refinements, such as the inclusion of frequency modulation, can be found in the dependent claims.

The following arrangement is in common usage for conventional operation (without modulation) of high-pressure discharge lamps: From a feed energy source, which is in the form, for example, of a battery or a conditioned mains voltage, a clocked d.c. voltage supply generates an operating voltage referred to a ground potential. The d.c. voltage supply is clocked at a converter frequency which is selected solely in terms of what matters for the d.c. voltage supply. Power loss, costs and geometric dimensions of the d.c. voltage supply play a role here. The operating voltage is essentially a d.c. voltage in the prior art. Since the lamps in question can usually be operated only using an a.c. voltage, the operating voltage is fed to an inverter at whose output terminals a lamp voltage can be tapped off which is essentially an a.c. voltage at an inverter frequency.

The operating voltage has, according to the invention, not only a d.c. component but also an a.c component. This a.c. component effects amplitude modulation of the lamp voltage. The ratio of the amplitude of the a.c. component to the magnitude of the d.c. component defines a degree of modulation. This needs to be greater than 10% for a desired resonance to be excited in the lamp.

The clocked d.c. voltage supply is used for amplitude modulation. Advantageously, no separate device is therefore required for modulation. According to the invention, the converter frequency is selected such that it is equal to a desired acoustic resonance in the lamp or an n-fold multiple of that value, where n is a natural number other than zero. Amplitude modulation of the operating voltage at an acoustic resonant frequency or its harmonic is thus achieved without additional outlay on circuitry. Whether the fundamental or a harmonic is excited depends on the desired deformation of the plasma. It has been shown in tests that, in order to excite longitudinal resonances, and thus to prevent demixing of the plasma, the preferred value for n is 2.

In many cases the lighting system is operated using a mains voltage as the feed energy source whose amplitude is greater than the lamp voltage of a connected lamp. For this reason, the clocked d.c. voltage supply is usually achieved by a step-down converter. If the feed energy source supplies a voltage which is less than the lamp voltage then a step-up converter is correspondingly employed. The average value for the operating voltage, and thus its d.c. component, which is provided by a step-down converter is, as is known, dependent on a pulse duty factor at which the step-down switch operates. In general, the operating voltage provided by the step-down converter is present across a storage capacitor which is connected in series with a step-down inductor. The converter frequency at which the step-down switch is operated is in this case, when dimensioned according to the prior art, essentially above the resonant frequency which has the series circuit comprising a storage capacitor and a step-down inductor. Such dimensions are desired if the a.c. component of the operating voltage is to be as small as possible. However, according to the invention, the a.c. component of the operating voltage is to be used for effecting amplitude modulation and for this reason, according to the invention, dimensions for the step-down inductor and the storage capacitor are chosen which permit AM resonance at the converter frequency.

An AM resonant circuit which produces the AM resonance is composed of a source impedance of the clocked d.c. supply and a connected load impedance. In the case of the abovementioned step-down converter the source impedance is essentially formed by the step-down inductor and the series-connected storage capacitor. The load impedance is connected in parallel with the storage capacitor. Capacitive components of the load impedance, when added, give the value of the storage capacitor. The AM resonant circuit is damped essentially by the resistive component of the load impedance, accounted for mainly by the lamp. The Q factor of the AM resonant circuit may be used to set the degree of amplitude modulation of the operating voltage.

The feed energy source supplies a feed voltage the value of which may advantageously also be used to set the degree of amplitude modulation. The ratio of the value of the feed voltage to the value of the operating voltage determines the abovementioned pulse duty factor. The pulse duty factor in turn influences the degree of modulation. The maximum degree of modulation, which has a theoretical limit of 100%, occurs for a pulse duty factor of 1:1. If the clocked d.c. voltage supply is implemented by a step-down converter and it is intended to achieve the highest possible degree of modulation, the feed voltage is to be selected at double the operating voltage. If the degree of modulation is required to be reduced then a deviation from this pulse duty factor in any desired direction is required.

There is also the possibility of controlling the degree of modulation by suitable means. The information about an actual value for the degree of modulation is contained in the a.c. voltage component of the operating voltage. This component can be obtained from the operating voltage by means of a high-pass filter. In the simplest case, the high-pass filter may be a capacitor. Once the actual value has been compared with a desired value, the value of the feed voltage may be set by means of a controller in such a manner that the desired value is obtained for the degree of modulation.

According to the abovementioned publication U.S. Pat. No. 6,184,633 (Kramer), an amplitude modulation frequency is required which is between 20 kHz and 30 kHz, for example, preferably 24.5 kHz.

Furthermore, the inverter frequency is not constant according to the invention. Rather, frequency modulation of the lamp voltage is achieved by modulating the inverter frequency, as is required in the abovementioned publication U.S. Pat. No. 6,184,633 (Kramer). Simultaneous amplitude and frequency modulation is thus effected with low outlay.

Frequency modulation is achieved according to the invention by the inverter frequency being varied according to the required frequency modulation. The inverter is preferably designed as a half-bridge. The half-bridge essentially comprises an upper and a lower half-bridge switch which are connected in series and are driven in alternating fashion at the inverter frequency. The upper half-bridge switch is connected to the operating voltage and the lower half-bridge switch is connected to the ground potential. As a result, a square-wave half-bridge voltage is formed at the connecting point of the half-bridge switches and this voltage has an amplitude which is equal to half the operating voltage and a frequency which is the inverter frequency.

The inverter frequency is preferably generated by a so-called Voltage Controlled Oscillator (VCO). The VCO controls a drive circuit which provides drive signals for the half-bridge switches. The VCO emits an inverter frequency at its output which is proportional to a VCO control voltage at the input to the VCO. The VCO control voltage is preferably periodic and has a frequency modulation frequency. In the case of known lamps which are suitable for operation in a lighting system according to the invention, the frequency modulation frequency is preferably approximately 100 Hz. The lower value of the instantaneous inverter frequency is approximately 40 kHz in the case of lamps of this kind, and the upper value is 60 kHz. This defines a frequency deviation of 20 kHz.

It has been shown that a saw-tooth characteristic of the modulation of the inverter frequency is particularly favorable for the lamp operation. Therefore, according to the invention the VCO is driven at its input by a saw-tooth generator which emits a saw-tooth voltage at the frequency modulation frequency.

Instead of the VCO and the saw-tooth generator, it is also possible to use a microcontroller functioning in the same manner. The signal forms described are then implemented by appropriate software in the microcontroller.

It is often desirable to operate the lamp not on a square-wave lamp voltage but on a sinusoidal lamp voltage. The square-wave half-bridge voltage is thus advantageously fed into the series circuit of a filter inductor and a filter capacitor. The output terminals of the lamp are connected to the filter capacitor by means of a coupling capacitor. The coupling capacitor has the function of suppressing the d.c. component of the half-bridge voltage. The filter inductor and the filter capacitor form a series resonant circuit having a resonant frequency which is advantageously of the order of magnitude of the inverter frequency. A sinusoidal voltage is thus achieved across the lamp. A resonant peak which is produced for the voltage across the filter capacitor may be used for igniting the lamp and for increasing the lamp voltage.

BRIEF DESCRIPTION OF THE DRAWINGS

The invention shall be explained in more detail below by means of an exemplary embodiment with reference to drawings, in which.

In the text below, switches are designated by the letter S, diodes by the letter D, inductors by the letter L, capacitors by the letter C, voltages by the letter U, and junctions by the letter J, in each case followed by a number.

In the text below, identical elements and functionally identical elements in the various figures are given the same reference symbols throughout.

BEST MODE FOR CARRYING OUT THE INVENTION

Figure 1:
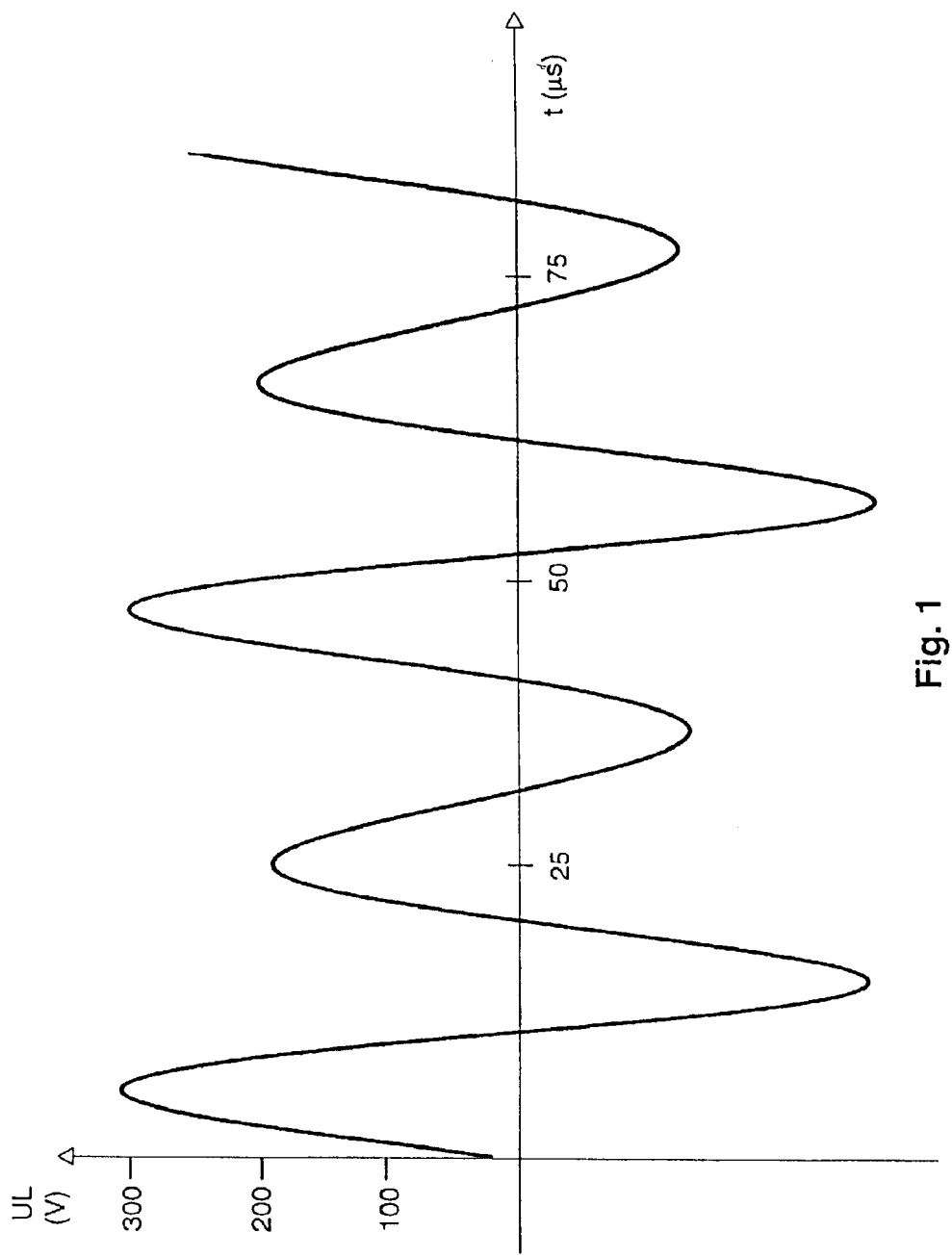
FIG. 1 shows the time characteristic according to the invention of a lamp voltage.

FIG. 1 shows the time characteristic according to the invention of a lamp voltage. It is a typical lamp voltage characteristic for a 70 W lamp having an root-mean-square value of the lamp voltage of approximately 180 V. The x axis represents the time t in microseconds ($\mu$s) and the y axis represents the lamp voltage UL in volts (V). The waveform is essentially sinusoidal. This can be achieved by a filter inductor and a filter capacitor. The frequency of the lamp voltage shown corresponds to the inverter frequency and is approximately 50 kHz. Frequency modulation cannot be seen in the time window shown since the frequency modulation frequency is preferably in the region of 100 Hz. Over the period of time shown of 100 $\mu$s the inverter frequency changes in the example shown by about 100 Hz. Accordingly, the cycle duration of the inverter frequency varies by about 0.04 $\mu$s.

Amplitude modulation can be seen clearly in FIG. 1. Since in the example chosen the inverter frequency is approximately double the converter frequency, every second maximum of the sinusoidal characteristic of the lamp voltage UL is lowered. The degree of amplitude modulation shown is approximately 25%.

Figure 2:
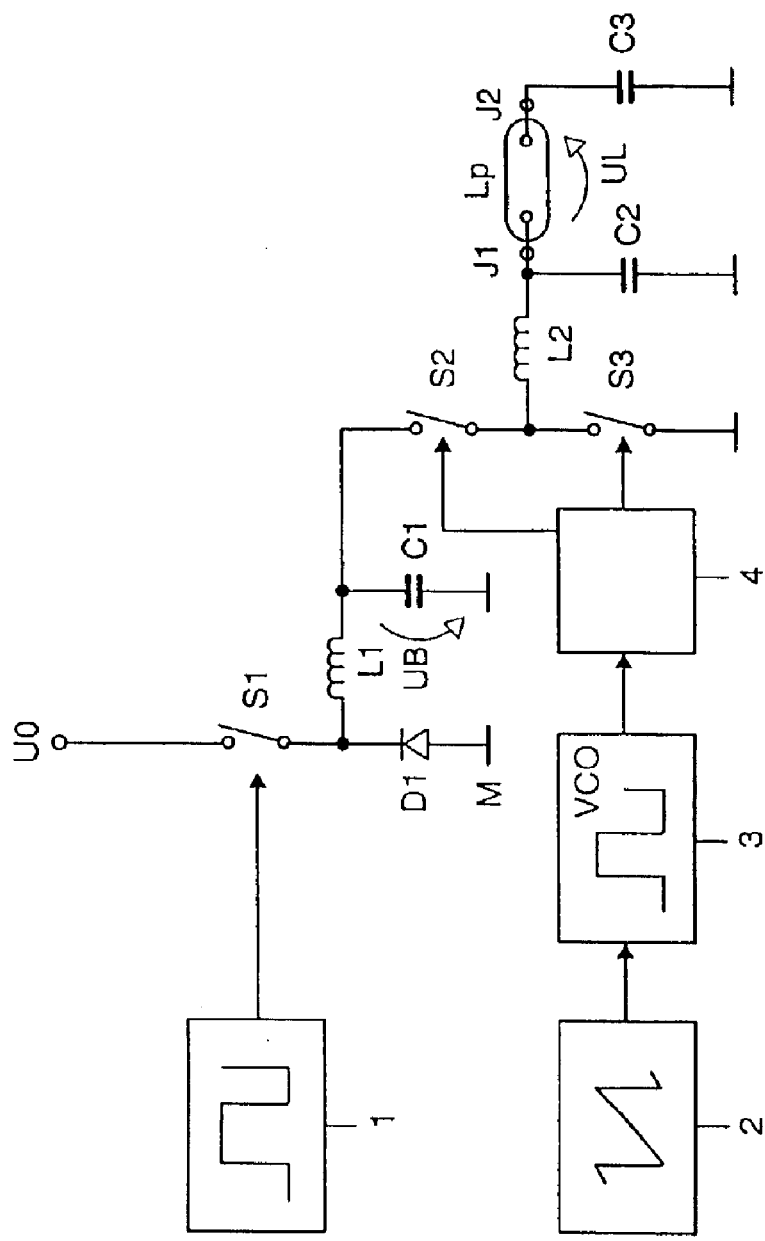
FIG. 2 shows a block diagram of a lighting system according to the invention.

FIG. 2 shows a block diagram of a preferred embodiment of a lighting system according to the invention. This embodiment can be achieved with particularly low outlay.

Between a potential U0 and the ground potential M, a supply voltage is fed from a feed energy source into a step-down converter which essentially comprises the following components: step-down switch S1, diode D1, step-down inductor L1, storage capacitor C1 and square-wave generator 1. The step-down converter implements the abovementioned clocked d.c. voltage source. S1 and D1 are connected in series between the potential U0 and the ground potential. S1 generally is designed in the form of a half-bridge switch, in particular a MOSFET or IGBT. It is controlled by the square-wave generator 1. In parallel with D1 is the series circuit of L1 and C1, C1 being connected to the ground potential M. At C1, an operating voltage UB is generated which is fed to a downstream inverter. The square-wave generator 1 emits a square-wave voltage at the converter frequency. The pulse duty factor of the square-wave voltage of the square-wave generator 1 remains constant in this exemplary embodiment and determines the d.c. component of the operating voltage UB.

According to the invention, the inverter is implemented in essence by a half-bridge. The series circuit of an upper half-bridge switch S2 and a lower half-bridge switch S3 is connected in parallel with the operating voltage UB. S2 and S3 are usually in the form of half-bridge switches, in particular MOSFETs or IGBTs. For the purpose of driving the half-bridge switches S2 and S3 a saw-tooth generator 2 is initially provided. It supplies a saw-tooth voltage which determines the characteristic of the inverter frequency. The frequency of the saw-tooth voltage determines the frequency modulation frequency and the amplitude of the saw-tooth voltage determines the frequency deviation of the lamp voltage UL. The saw-tooth voltage controls a VCO 3 which emits a square-wave voltage to a drive circuit 4 whose frequency is proportional to the saw-tooth voltage. The trigger circuit 4 provides drive signals for the half-bridge switches S2 and S3, as a result of which said switches are closed and opened in step with the inverter frequency. In this manner the inverter frequency follows the characteristic of the saw-tooth voltage. At the connecting point of the half-bridge switches S2 and S3, an amplitude- and frequency-modulated square-wave voltage can thus be tapped off according to the invention with reference to the ground potential M. This voltage is fed to the series circuit of a filter inductor L2 and a filter capacitor C2. The resonant frequency of this series circuit is of the order of magnitude of the inverter frequency, as a result of which an approximately sinusoidal voltage is generated at C2. The series circuit of a lamp Lp and a coupling capacitor C3 is connected in parallel with C2. C3 has the function of suppressing the d.c. component of the voltage supplied by the inverter. The lamp Lp is connected by means of the junctions J1 and J2. The lamp voltage UL is present across the lamp Lp.

The source impedance of the step-down converter is essentially formed by the step-down inductor L1 and the storage capacitor C1. The load impedance is essentially due to the lamp Lp. The source impedance and load impedance together form an AM resonant circuit which forms AM resonance. AM resonance occurs, according to the invention, at the converter frequency. In the example illustrated, although L2, C2 and C3 are components of the load impedance, they do not influence the AM resonance to any great extent.

The Q factor of the AM resonant circuit can be used to adjust the amplitude of the a.c. component of the operating voltage UB. The ratio of the amplitude of the a.c. component to the d.c. component determines, according to the invention, the degree of modulation of the desired amplitude modulation of the lamp voltage UL.

Figure 3:
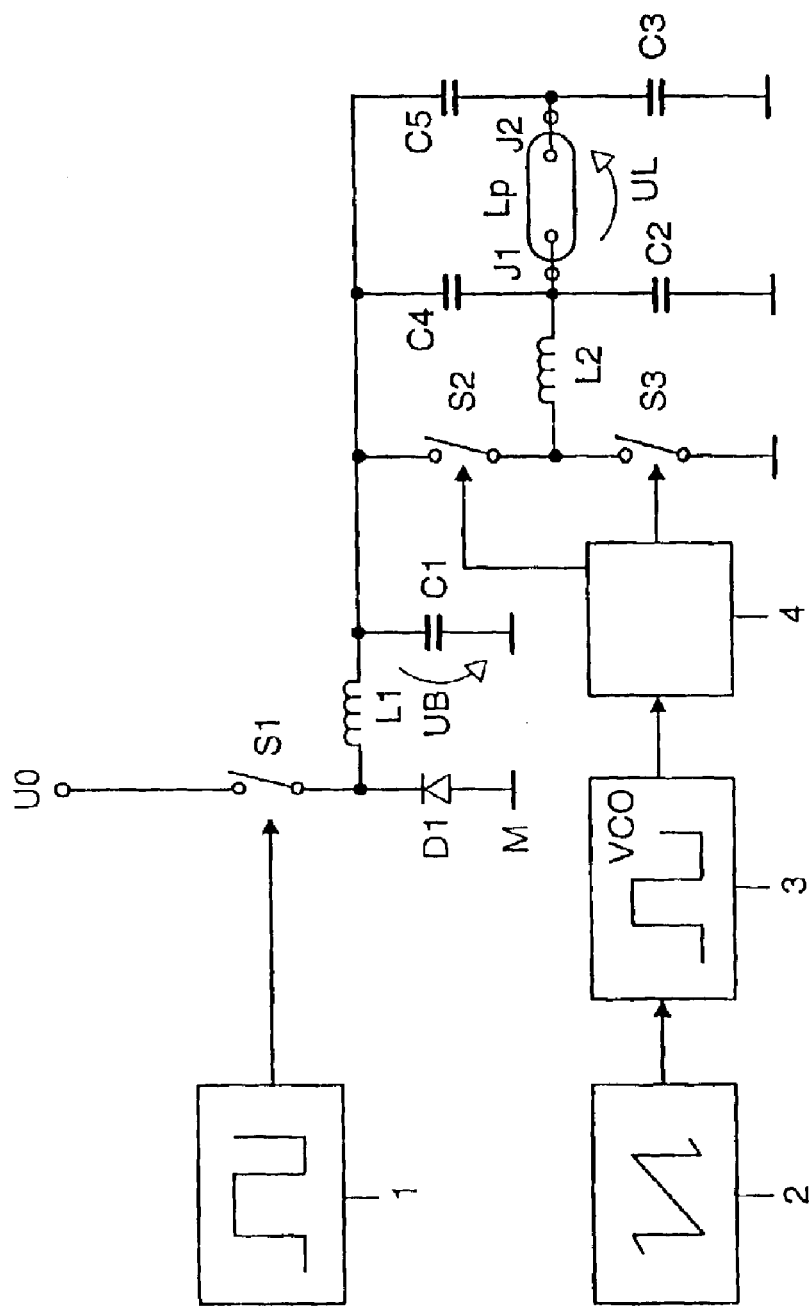
FIG. 3 shows a block diagram of a further lighting system according to the invention.

FIG. 3 shows a further exemplary embodiment of the lighting system according to the invention. In comparison with FIG. 2, additional components are the capacitors C4 and C5. The circuit of the inverter is thus made symmetrical. From junction J1 not only is the filter capacitor C2 led to the ground potential M but also a further filter capacitor C4 is led to the operating voltage potential UB. C2 and C4 have the same capacitance values. Similarly, from junction J2 not only is the coupling capacitor C3 led to the ground potential M but also a further coupling capacitor C5 is led to the operating voltage potential UB. C3 and C5 have the same capacitance values. By making the circuits symmetrical as described, the lamp voltage UL characteristic is symmetrical in relation to the ground potential M. It has been shown that this works in favor of the formation of desired acoustic resonances in the lamp.

The inverter can also be made symmetrical as shown in FIG. 3 by making only the filter capacitors C2, C4 or the coupling capacitors C3, C5 symmetrical. It is also possible for only that capacitor to be present in an asymmetrical embodiment which is connected to the operating voltage potential UB. In general terms, at least one capacitor in each case of the two pairs of capacitors C2, C4 and C3, C5 must be present. A further possible variant is one in which the coupling capacitor is designed to be symmetrical, i.e. C3 and C5 are present. As can be seen from FIG. 3, the series circuit of C3 and C5 is connected in parallel with the storage capacitor C1. The capacitance values for C3 and C5 can now be selected such that C3 and C5 can also take on the function of C1, so that C1 can be dispensed with. The source impedance then essentially only comprises the step-down inductor L1 and the load impedance of the lamp Lp and the coupling capacitors C3 and C5. For AM resonance the filter inductors L2 and the filter capacitors C2 and C4 can usually be disregarded.

What is claimed is:

1. A lighting system comprising:
    a d.c. voltage supply which is clocked at a converter frequency and supplies an operating voltage,
    an inverter which is fed by the operating voltage and has output terminals at which a lamp voltage is present,
    a high-pressure discharge lamp which is connected to the output terminals and has at least one acoustic resonant frequency,
wherein:
    the converter frequency is an n-fold multiple of the at least one acoustic resonant frequency of the high-pressure discharge lamp, where n is a natural number other than zero,
    the inverter is designed as a half-bridge, in which case an upper and a lower half-bridge switch (S2, S3) are switched alternately on and off at an inverter frequency,
    the inverter frequency is modulated, and
    the lighting system further comprises a saw-tooth voltage generator (2) that emits a saw-tooth voltage which is fed to a VCO (3) which generates an inverter frequency modulated by the characteristic of the saw-tooth voltage and by means of which the half-bridge switches (S2, S3) are driven.

2. The lighting system as claimed in claim 1, wherein the acoustic resonance is a longitudinal resonance and n is equal to 2.

3. The lighting system as claimed in claim 2, wherein the clocked d.c. voltage supply is a step-down converter having a step-down switch which supplies an operating voltage which is dependent on a pulse duty factor of the step-down switch, the d.c. component of the operating voltage being determined by varying the pulse duty factor.

4. The lighting system as claimed in claim 2, wherein the clocked d.c. voltage supply is a step-up converter having a step-up switch which supplies an operating voltage which is dependent on a pulse duty factor of the step-up switch, the d.c. component of the operating voltage being determined by varying the pulse duty factor.

5. The lighting system as claimed in claim 1, wherein the clocked d.c. voltage supply is a step-down converter having a step-down switch which supplies an operating voltage which is dependent on a pulse duty factor of the step-down switch, the d.c. component of the operating voltage being determined by varying the pulse duty factor.

6. The lighting system as claimed in claim 1, wherein the clocked d.c. voltage supply is a step-up converter having a step-up switch which supplies an operating voltage which is dependent on a pulse duty factor of the step-up switch, the d.c. component of the operating voltage being determined by varying the pulse duty factor.

7. The lighting system as claimed in claim 1, wherein the clocked d.c. voltage supply has a source impedance which, together with the connected load impedance which is formed by the inverter and the lamp, has AM resonance which is equal to the converter frequency.

8. The lighting system as claimed in claim 1, wherein the converter frequency is between 20 kHz and 30 kHz and the inverter frequency is between 40 kHz and 60 kHz.

9. The lighting system as claimed in claim 1, wherein the d.c. voltage supply draws its energy from a feed voltage, means being provided to control the value of the feed voltage such that the operating voltage has a desired degree of amplitude modulation.

* * * * *